US007433414B2

(12) United States Patent
Nguyen et al.

(10) Patent No.: US 7,433,414 B2
(45) Date of Patent: Oct. 7, 2008

(54) INTELLIGENT ARRAY RADIO ARCHITECTURE

(75) Inventors: Hung C. Nguyen, Milpitas, CA (US);
Jifeng Geng, San Diego, CA (US);
Ruoyang Lu, Milpitas, CA (US);
Catherine A. French, Olympia, WA (US)

(73) Assignee: Sigma Designs, Inc., Milpitas, CA (US)

( * ) Notice: Subject to any disclaimer, the term of this patent is extended or adjusted under 35 U.S.C. 154(b) by 674 days.

(21) Appl. No.: 11/022,199

(22) Filed: Dec. 21, 2004

(65) Prior Publication Data
US 2006/0018392 A1 Jan. 26, 2006

Related U.S. Application Data

(60) Provisional application No. 60/591,336, filed on Jul. 26, 2004.

(51) Int. Cl.
*H04K 1/10* (2006.01)
(52) U.S. Cl. .................. 375/260; 375/267; 375/347; 375/349; 375/316; 455/183.1; 455/165.1; 455/132; 455/137; 455/184.1
(58) Field of Classification Search .......... 375/260, 375/267; 455/183.1, 165.1, 132, 137, 184.1
See application file for complete search history.

(56) References Cited

U.S. PATENT DOCUMENTS 5,175,863 A * 12/1992 Jones, Jr. ................ 712/36
5,937,018 A * 8/1999 Golden ................... 375/347
5,982,327 A * 11/1999 Vook et al. .............. 342/380
6,875,110 B1 * 4/2005 Crumby ................... 463/42
2004/0077319 A1 * 4/2004 Koike et al. .............. 455/101
2004/0106386 A1 * 6/2004 Doi ...................... 455/165.1
2004/0142665 A1 * 7/2004 Papathanasion et al. ... 455/101
2004/0209652 A1 * 10/2004 Doi ....................... 455/561
2005/0003769 A1 * 1/2005 Foerster et al. ............ 455/113
2005/0237956 A1 * 10/2005 Kuperschmidt et al. ... 370/310
2005/0237965 A1 * 10/2005 Kuperschmidt et al. ... 370/321
2006/0187909 A1 * 8/2006 Sho et al. ................. 370/389

OTHER PUBLICATIONS

Edfors, Ove et al., "OFDM Channel Estimation of Singular Value Decomposition" IEEE Transactions on Communications, vol. 46, No. 7, pp. 931-939, Jul. 1998.
Kay, Steven M., "Fundamental of Statistical Signal Processing: Estimation Theory" Prentice Hall PTR, Chapter 8, pp. 219-227, 1993.
Widrow, B. et al., "Adaptive Signal Processing" Prentice Hall, Inc., Chapter 2, pp. 15-16, and Chapter 6, pp. 99-103, 1985.

* cited by examiner

*Primary Examiner*—Chieh M. Fan
*Assistant Examiner*—Siu M Lee
(74) *Attorney, Agent, or Firm*—Thelen Reid Brown Raysman & Steiner; Aaron Wininger

(57) ABSTRACT

A receiver sets weights for an antenna array according to a series of algorithms including an energy algorithm, a least squares algorithm and a least mean square algorithm.

21 Claims, 4 Drawing Sheets

INTELLIGENT ARRAY RADIO ARCHITECTURE

PRIORITY REFERENCE TO PRIOR APPLICATIONS

This application claims benefit of and incorporates by reference U.S. patent application Ser. No. 60/591,336, entitled "Adaptive Antenna Array Architecture," filed on Jul. 26, 2004, by inventors Hung C. Nguyen, Catherine A. French, Jifeng Geng and Ruoyang Lu.

TECHNICAL FIELD

This invention relates generally to ultrawideband communication, and more particularly, but not exclusively, provides an intelligent array radio (IAR) architecture, which is a type of adaptive antenna array architecture, and method of use thereof.

BACKGROUND

Wireless systems use antennas at both ends of a link, e.g., at an access point and at a station (e.g., laptop, personal digital assistant, etc.). However, the range of conventional antennas can be degraded by several factors, such as path loss due to objects in the line of sight; environmental changes; and signal reflections. Further, conventional wireless systems can be complicated and expensive to deploy because of coverage requirements.

Accordingly, a new system and method are needed that overcome the above-mentioned deficiencies.

SUMMARY

Embodiments of the invention provide a system and method for extending wireless coverage using a receiver antenna array by setting weights to channel paths. Embodiments improve building penetration, improved robustness to system perturbations; reduce sensitivity to non-ideal behavior; reduce power consumption (when used for conventional range); mitigate signal degradation due to signal reflections; and reduce deployment costs.

In an embodiment of the invention, the method comprises: setting channel weights based on energy values; updating channel weights using a least squares algorithm based on received data and expected data; revising channel weights using a least mean square algorithm based on received data and expected data, and using channel weights to combine incoming signals from multiple antennas into a single complex signal.

In an embodiment of the invention, the system comprises: a set weight engine that sets channel weights based on energy values; a least squares engine, which is communicatively coupled to the energy engine, that updates channel weights using a least squares algorithm based on received data and expected data; and a least mean square engine, which communicatively coupled to the least squares engine, that revises channel weights using a least mean square algorithm based on received data and expected data. The use of the three engines results in more robust performance of the receiver, as each engine solves a different problem. The energy engine provides a simple algorithm for setting weights prior to synchronization. The least squares engine provides a quickly converging algorithm to set initial weights for the least mean square algorithm. The least mean square engine provides an optimum algorithm to increase effective signal to noise ratio.

In an embodiment of the invention, the intelligent array radio system is positioned within the overall receiver in a novel and advantageous way. In particular, when the invention is used as part of an Orthogonal Frequency Division Multiplexed (OFDM) system, the intelligent array radio block is placed after the analog-to-digital converters (ADCs), which means that the implementation can use digital signal processing techniques. Such techniques are more predictable than alternative radio frequency (RF) implementations that are affected by temperature and process variations. In addition to being placed after the ADCs, the intelligent array radio system is positioned before the Fast Fourier Transform (FFT). This means that the calculations of this invention are performed after analog to digital conversion and in the time domain before the Fast Fourier Transform and channel equalization, and that only a single FFT circuit and a single channel equalization circuit are required after the intelligent array radio block. This in contrast to other adaptive antenna array architectures that place the adaptive processing after the FFT, thus performing the processing in the frequency domain. In such architectures, the entire receiver path from the RF circuitry through the FFT and channel equalizer must be duplicated for each antenna. Therefore, the current invention has more robust performance and decreased circuitry requirements compared to other antenna array designs.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

The following description is provided to enable any person having ordinary skill in the art to make and use the invention, and is provided in the context of a particular application and its requirements. Various modifications to the embodiments will be readily apparent to those skilled in the art, and the principles defined herein may be applied to other embodiments and applications without departing from the spirit and scope of the invention. Thus, the present invention is not intended to be limited to the embodiments shown, but is to be accorded the widest scope consistent with the principles, features and teachings disclosed herein.

Figure 1:
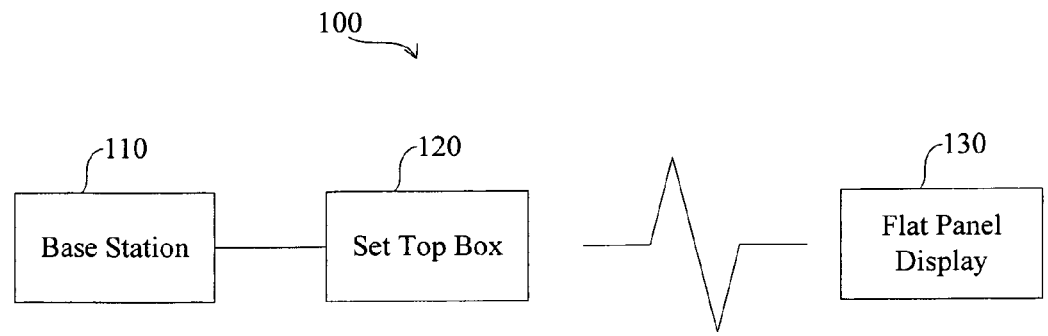
FIG. 1 is a block diagram illustrating a network system.

FIG. 1 is a block diagram illustrating a network system 100. A set top box (STB) 120 is communicatively coupled to a flat panel display 130 and a base station 110. In an embodiment of the invention, the STB 120 is wirelessly communicatively coupled to the flat panel display 130 via an ultra wideband (UWB) link. The connection between the STB 120 and the base station 110 can be wired (e.g., cable) or wireless (e.g., satellite).

During operation of the network system 100, the STB 120 receives television (TV) programming or other data from the base station 110 and transmits it to the flat panel display 130 via UWB. The flat panel display 130 receives the data via UWB, converts the received data to a format capable of being displayed on the display 130 and displays the converted data. Accordingly, by using UWB, the amount of wiring required is reduced.

Figure 2:
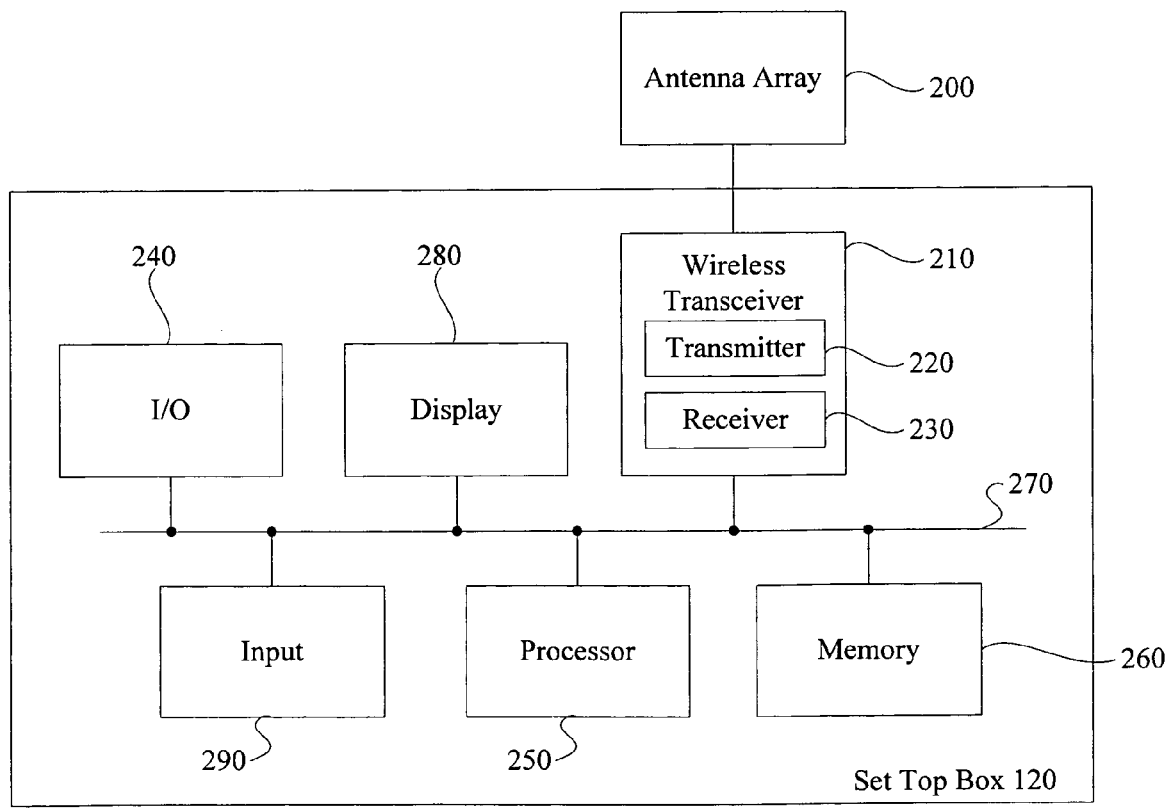
FIG. 2 is a block diagram illustrating a set top box of the network system of FIG. 1.

As will be described in further detail below, the flat panel display 130 and/or the STB 120 includes an antenna array, such as antenna array 200 (FIG. 2). The antenna array 200 includes two or more antennas. A receiver section accords gain settings to each antenna based on calculations related to the energy and known preamble data of the signal received at each antenna in the array 200. In an embodiment of the invention, the preamble is ultra wideband and defined by the Multiband OFDM Alliance (MBOA). In an embodiment of the invention, the ultra wideband preamble includes predetermined patterns that allow detection of the preamble signal, and additional preamble patterns that are used to perform channel equalization.

FIG. 2 is a block diagram illustrating the STB 120 of the network system 100 of FIG. 1. The STB 120 includes a wireless transceiver 210 capable to wirelessly communicate with other wireless devices, such as the flat panel display 130, via UWB; a memory device 260, such as such as a magnetic disk, Random Access Memory (RAM), Flash Memory or other memory device or combination thereof; a processor 250, such as an ARM 7 microprocessor or a Motorola 68000 microprocessor; a display 280; and an input device 290, all interconnected for communication by a system bus 270. In addition, wireless transceiver 210 is communicatively coupled to an antenna array 200. The STB 120 also includes an I/O port 240 for communicatively coupling to the base station 110.

Transceiver 210 can wirelessly transmit and receive data using UWB via the antenna array 200. The array 200 comprises 2 or more antennas. In an embodiment of the invention, the array 200 comprises 3 antennas in a triangular geometry or other geometry, such as a straight line. The transceiver 210 comprises a transmitter 220 for transmitting data and a receiver 230 for receiving data. The receiver 230 will be discussed in further detail below in conjunction with FIG. 3.

The processor 250 executes engines stored in the memory 260 to transmit and receive data to other UWB-enabled wireless devices, such as the flat panel display 130. The display 280 comprises a LCD display or other device for displaying data, such as channel selection. Input 290 includes a keyboard and/or other input device and enables a user to change channels.

Figure 3:
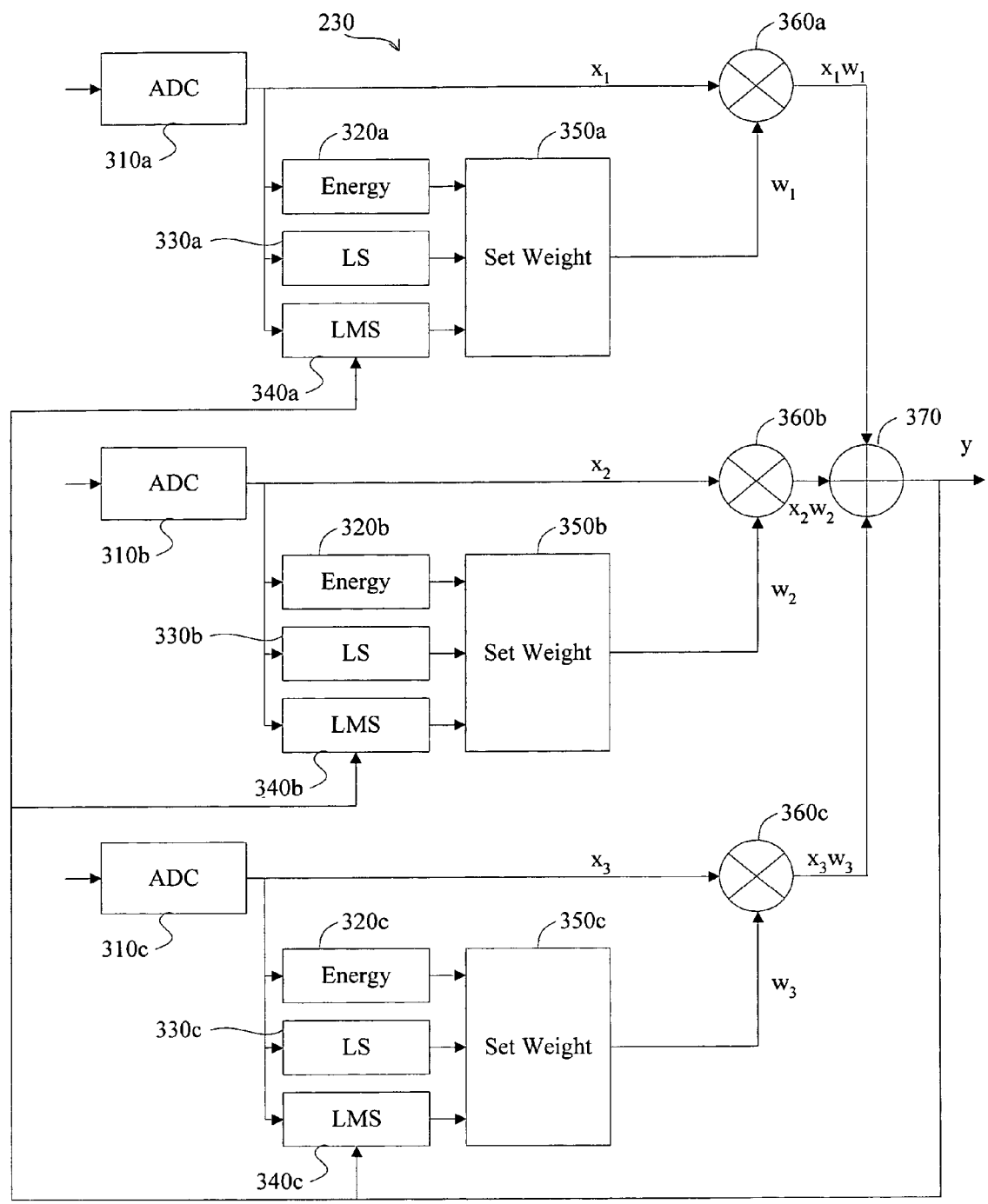
FIG. 3 is a block diagram illustrating a portion of a receiver section of the set top box of FIG. 2 according to an embodiment of the invention.

FIG. 3 is a block diagram illustrating a portion of the receiver section 230 of the STB 120 (FIG. 2) according to an embodiment of the invention. It will be appreciated by one of ordinary skill in the art that the receiver section 230 (and/or the entire transceiver 210) may be incorporated into any device requiring UWB communication capabilities (e.g., a laptop computer). Each antenna in the antenna array 200 including associated radio frequency (RF) circuitry is communicatively coupled to a respective analog to digital converter (ADC) that converts analog signals to digital signals. Each analog to digital converter shown in FIG. 3 consists of two physical ADCs, one for an in-phase signal and one for a quadrature signal. The resulting signal out of each ADC is therefore complex-valued, with the real part equal to the in-phase component, and the imaginary part equal to the quadrature component. Accordingly, for a three-antenna array, there are three complex ADCs. Each complex ADC and subsequent processing blocks are referred to as paths or channels. For example, a first antenna and associated radio frequency circuitry is coupled to the ADC 310*a* and a second antenna is coupled to the ADC 310*b*, etc. Each ADC 310 is in turn coupled to three engines: an energy engine 320, a LS engine 330 and a LMS engine 340. For example, the ADC 310*a* is communicatively coupled to an energy engine 320*a*, a, LS engine 330*a*, and a LMS engine 340*a*. The engines 320, 330 and 340 are each communicatively coupled to a set weight engine 350, which is coupled to a multiplier 360, e.g., the engines 320*a*, 330*a*, and 340*a* are each communicatively coupled to a set weight engine 350*a*, which is communicatively coupled to a multiplier 360*a*.

The ADCs 310 are also each communicatively coupled directly to their respective multipliers 360. In an embodiment of the invention, the set weight engines 350 can be each communicatively coupled to each other so as to compare energy values calculated by the energy engines 320. The multipliers 360 are each communicatively coupled to an adder 370, also known as a combiner, which is coupled to the LMS engines 340 and to a Fast Fourier Transform (FFT; not shown); e.g., the multiplier 360*a* is communicatively coupled to the adder 370, which is communicatively coupled to a FFT and to the LMS engines 340*a*, 340*b*, and 340*c*. By placing the FFT after the weight setting engines, only a single FFT is required in contrast to conventional systems that require one FFT per channel path.

The ADCs 310 receive RF signals from the antenna array 200 and convert the signals to digital signals. The engines, 320, 330 and 340, which can be implemented in software, as application specific integrated circuits (ASICs), or other techniques, are used to calculate weights for the ADC output. The energy engine 320 calculates energy for a respective channel and the select weight engine 350 compare energy values and sets the weight to 1 for the channel having the highest energy value. In an alternative embodiment, the set weight engine 350 selects the weights to be equal for each ADC output or determines which of a pre-specified or random ADC output weight should be set to 1. The LS engine 330 then refines the weight settings using a least squares algorithm based on ADC data and a known preamble sequence. The LMS engine 340 then determines the final weights using a least mean square algorithm that begins by using the weight determined by the LS engine 330, additional ADC output, the combiner output and a known preamble sequence. The engines 320, 330 and 340 will be discussed in further detail below in conjunction with FIG. 4-FIG. 6, respectively.

After the weights are determined by each engine 330-340 (or energy for each engine 320), the set weight engine 350 sets the weight for its respective pair of ADCs. The respective multipliers 360 then multiply the ADC output data by the respective weights. After multiplication, the adder 370 adds the multiplied values together. The adder 370 also forwards the added results to the LMS engines 340.

The timing for when the engines 320-340 are used is flexible and can be coordinated with other calculations that must occur in other receiver blocks (not shown) during the preamble phase of transmission. For example, the energy engine can be used first, and the weights determined from this engine held constant once signal is detected by the downstream blocks. The gain control and synchronization functions of the downstream blocks could then occur, followed by the LS function of the current invention. Finally, the LMS engine could set weights during the final portions of the preamble, and the weights would then be held constant during reception of user data. In an embodiment of the invention, the energy calculation is performed during reception of preamble patterns that determine detection of a preamble signal, and is coordinated with a calculation that detects the preamble.

In an embodiment of the invention, the least squares updating is performed during reception of the preamble patterns that determine detection of the preamble signal, after the preamble has been detected and after synchronization and gain adjustment have been achieved. In an embodiment of the invention, the least mean squares updating is performed during reception of the preamble patterns that are used to perform channel equalization, with the timing of the least mean squares updating coordinated with the channel equalization.

Figure 4:
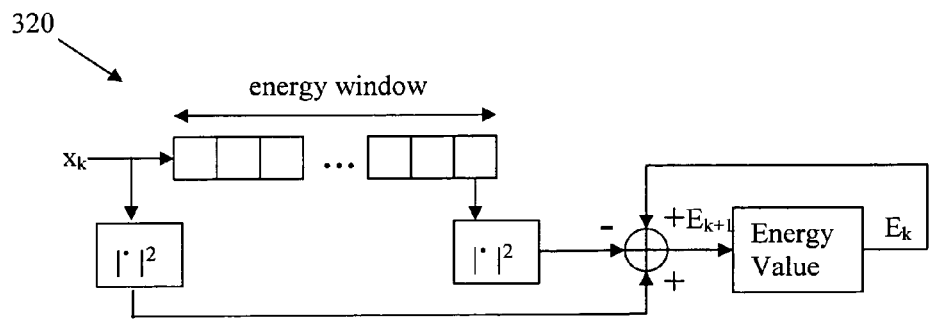
FIG. 4 is a block diagram illustrating an energy engine of the receiver section.

FIG. 4 is a block diagram illustrating an energy engine 320 of the receiver section 230. Note that the subscript (1, 2, or 3, indicating the antenna/channel number) is left off of x in this figure, and the subscript k represents the time index. There is one energy engine 320 per pair of ADCs 310. Note that all arithmetic operations and storage devices are for complex-valued x.

After the first symbol in the preamble, the weights are set using either equal gain diversity, or selection diversity. For equal gain diversity, all weights are set to $1/N_a = 1/3$ where $N_a$ is the number of ADCs 310. For selection diversity, the weights are set using the energy engine 320 as described in the paragraphs that follow. The choice between these two is programmable.

The mathematical equivalent of the energy engine 320 is:

$$E_{k+1} = \sum_{i=1}^{N_E - 1} |x_{k-i}|^2 = E_K + |x_k|^2 - |x_{k-N_E}|^2$$

where $E_{k+1}$ indicates the new computed value of the energy, $E_k$ is the previous value, and $N_E$ is the energy window size.

An Energy Value register and a register that stores one window of incoming values of $x_k$ should be initialized to 0 at the start of a packet. The energy window size, $N_E$, should be chosen in accordance with preamble characteristics. For example, in a multiband orthogonal frequency division multiplexed (OFDM) system, an appropriate choice for the energy window size would be one or more OFDM symbols (each containing a number of complex samples); the exact size of the window can be chosen to be a value that works best for the hardware. If desired, the squaring device can be implemented as a lookup table rather than a multiplier as shown in Table 1.

TABLE 1

Energy Lookup Table (with ADC output interpreted as an integer)

| ADC output (hex, twos complement) | Energy (decimal integer) | ADC output (hex, twos complement) | Energy (decimal integer) |
|---|---|---|---|
| 0 | 0 | 8 | 64 |
| 1 | 1 | 9 | 49 |
| 2 | 4 | A | 36 |
| 3 | 9 | B | 25 |
| 4 | 16 | C | 16 |
| 5 | 25 | D | 9 |
| 6 | 36 | E | 4 |
| 7 | 49 | F | 1 |

Energy is computed continuously for all ADCs 310, and the ADC with the highest energy is chosen by the set weight engines 350 by setting that weight to 1 and the other two weights to 0. The ADC 310 weights can be either set just once, or they can be updated continuously until a signal (e.g., a preamble) is detected by a downstream block. Once the signal is found, the ADC output weights are held unchanged until the LS algorithm is ready to update the weights, as will be discussed below in conjunction with FIG. 5.

Figure 5:
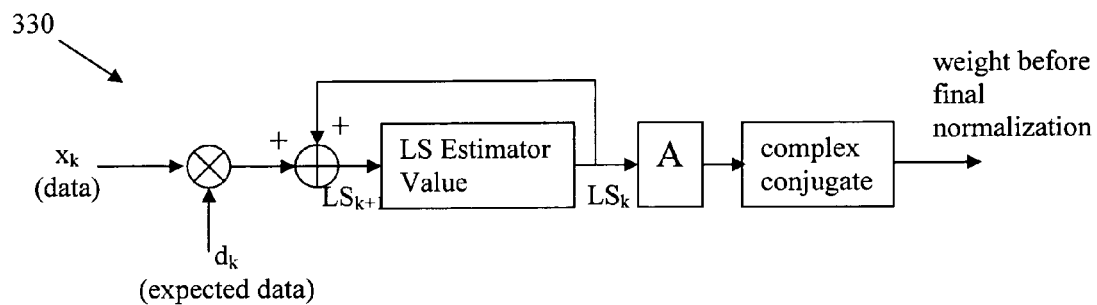
FIG. 5 is a block diagram illustrating a least squares engine of the receiver section.

FIG. 5 is a block diagram illustrating the least squares (LS) engine 330 of the receiver section 230. Note that, in this figure, the subscript k is the time index and not the antenna number. Again, each path (each ADC 310) requires an LS engine 330. In FIG. 5, $d_k$ refers to one real-valued sample of the preamble sequence (although the preamble sequence could also be complex-valued) and $x_k$ refers to one complex-valued sample coming from one of the ADCs. Note that the $d_k$ and $x_k$ values need to be in sync in terms of their time indexes. For example, if the data, $x_k$, were received without any distortion or noise, it would look exactly like the preamble sequence and the multiplication would essentially be a squaring of each of the values in the preamble sequence.

The mathematical equivalent of the LS engine 330 is:

$$w = \left| \frac{\sum_{k=0}^{N_{LS}-1} x_k d_k}{\sum_{k=0}^{N_{LS}-1} d_k^2} \right| = A \sum_{k=0}^{N_{LS}-1} x_k^* d_k$$

where $N_{LS}$ is the number of complex samples over which the LS is to be computed (for example, 2 OFDM symbols each consisting of a number of samples), and A is one divided by the energy of the desired sequence, $d_k$, over the interval $N_{LS}$. In the equation, the time index k=0 indicates the first sample over which the LS algorithm is computed. The equation illustrates that the complex conjugate in FIG. 5 can be done either at the beginning as shown in the figure, or after the multiplication by A. In an embodiment of the invention, A can be left out (or set to 1) since normalization can be performed after the weight calculation.

Once synchronization is achieved elsewhere in the receive path, the receiver 230 will be notified and the weights will be computed using a Least Squares (LS) algorithm. The IAR receiver 230 will be informed of the position within the preamble, this information can be used to synchronize the calculations during the LS algorithm.

The LS Estimator Value should be initialized to 0 before starting the algorithm. The LS estimator should be accumulated for a fixed number of samples (e.g., one or more OFDM symbols), after which it is multiplied by a factor, A, which is determined from the energy of the PS sequence. The receiver 230 weight is updated at the very end of this computation, and is equal to the output of a normalizer block.

The weights out of the LS algorithm require an additional normalization to take into account the gains on the three channels and the fact that three channels are to be combined. The normalization value is: $C = |w_1|^2 + |w_2|^2 + |w_3|^2$. Each of the weights will need to be divided by C before the weights are updated and used by the adder 370. Thus, an embodiment of the invention includes a division circuit.

Figure 6:
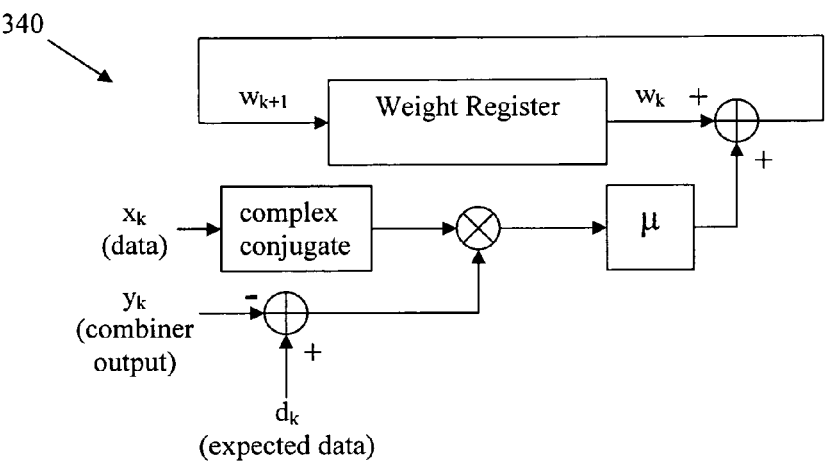
FIG. 6 is a block diagram illustrating a least mean square engine of the receiver section.

FIG. 6 is a block diagram illustrating the least mean square (LMS) engine 340 of the receiver section 230. During the latter phase of the preamble, the Least Mean Square adaptive algorithm is used to make the final adjustments to the weights. The mathematical equivalent of the LSM engine 340 is: $w_{k+1} = w_k + \mu(d_k - y_k)x_k^*$.

The LMS engine 340 operates as follows:

1. The initial value in the Weight Register is the value computed previously using the LS engine 330.

2. Once the LMS algorithm begins, the LMS engine 340 will be clocked for a fixed number of samples, (e.g., one or more OFDM symbols).

3. On each clock, the Weight Register is updated with the newly computed weight for that channel.

4. The $d_k$, $x_k$, and $y_k$ values all need to be in sync in terms of their time indexes. For this case, $d_k$ represents the real-valued samples of the preamble ("d" stands for desired sequence), $x_k$ is the complex received sequence for one of the channels, and $y_k$ is the complex output of the combiner (i.e., y in FIG. 3).

5. The constant scaling factor, µ, can be set equal to $2^m$, where m is a programmable integer value. Thus, this multiplication by µ is equivalent to a shift by m bits.

In an embodiment of the invention, the weights can be set externally. In this embodiment, the receiver 220 comprises 3 complex-valued weight registers, one for each channel.

Note that the description given above assumes one sample per clock. In an embodiment of the invention, the receiver 220 will deal with more than one sample per clock. For example, 4 samples clock may be used. Accordingly, for the energy computation in FIG. 4, the four newest values of $|x_k|^2$ will be added to the overall energy value in one clock, and the four oldest values will be subtracted during that clock. The energy window will be extended to accommodate these extra samples.

For the LS algorithm, the updating of the LS Estimator Value can also done four samples at a time. Referring to FIG. 5, the value of the LS Estimator on a given clock will be: $LS_{k+4} = LS_k + x_k d_k + x_{k+1} d_{k+1} + x_{k+2} d_{k+2} + x_{k+3} d_{k+3}$.

Finally, the equation for the LMS algorithm in the four-samples-per-clock case is:

$$w_{k+4} = w_k + \mu [(d_k - y_k) x_k^* + (d_{k+1} - y_{k+1}) x_{k+1}^* + (d_{k+2} - y_{k+2}) x_{k+2}^* + (d_{k+3} - y_{k+3}) x_{k+3}^*]$$

The weight values in this case will not be updated for every sample within a clock; instead, the same value of weight will be used for all samples within a clock.

In an embodiment of the invention, the IAR architecture can be made to accommodate frequency hopping. In this case, the Energy engine would operate as previously described. The LS engine could be expanded to include circuitry that would compute separate weights for each of frequency bands used in the frequency hopping scheme. The LMS engine also could be expanded to calculate separate weights for each frequency band.

Figure 7:
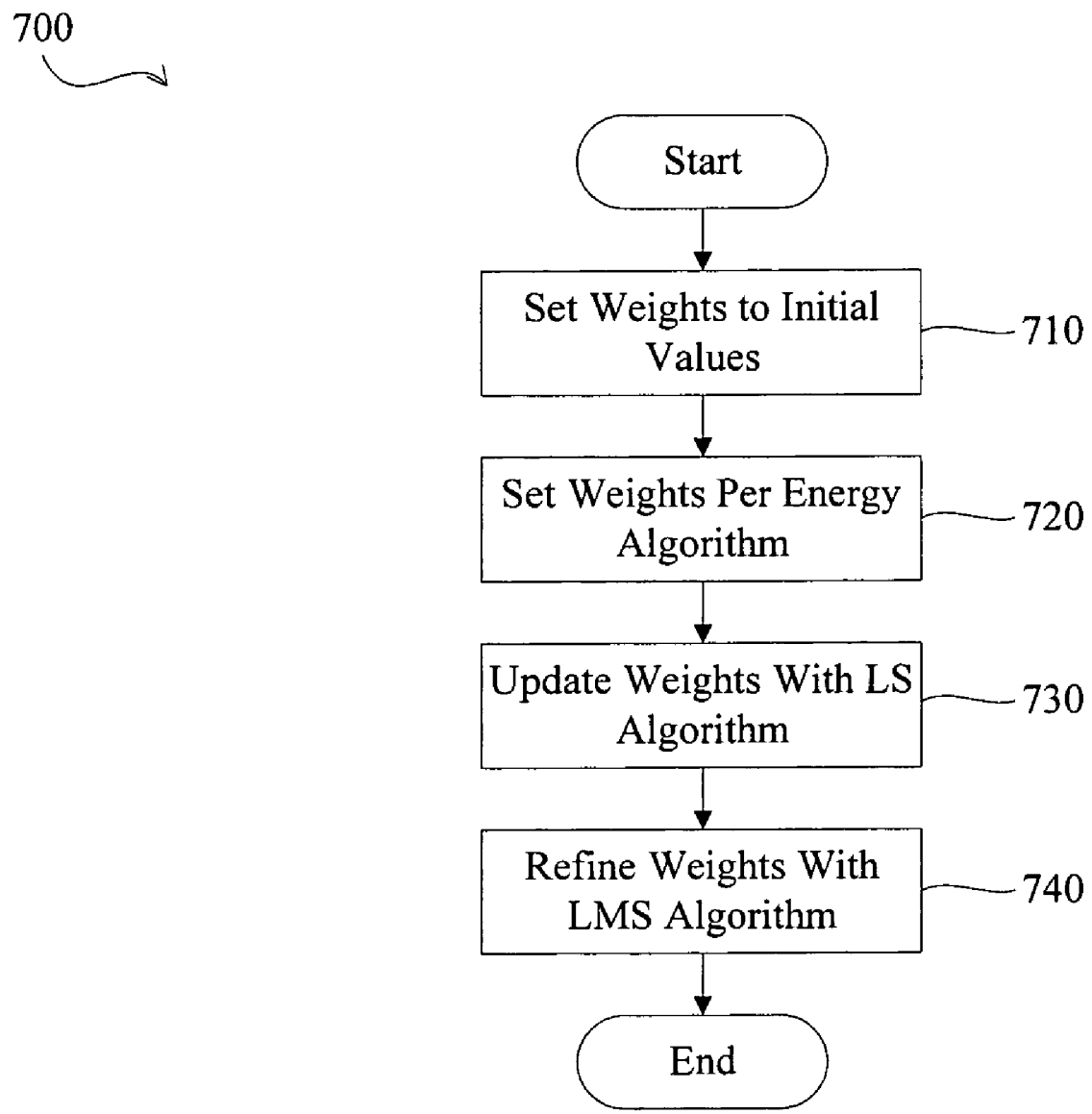
FIG. 7 is a flowchart illustrating a method of setting weights in an antenna array.

FIG. 7 is a flowchart illustrating a method 700 of setting weights for the antenna array 200. In an embodiment of the invention, the receiver 230 executes the method 700. First, the weights for each channel are set (710) to initial values. The weights can be set to be equal or they can be set such that one of the weights is 1 and the other 0. In an embodiment of the invention, if the weights are set equally, then the weights are not set (720) using the energy algorithm. Afterwards, the energy of the channels is calculated and weights set (720) such that the channel with highest energy has a weight of 1 and the remaining channels 0. Next, the weights are calculated and then updated (730) using the LS algorithm. Next, the weights are refined (740) using the LMS algorithm. The method 700 then ends.

The foregoing description of the illustrated embodiments of the present invention is by way of example only, and other variations and modifications of the above-described embodiments and methods are possible in light of the foregoing teaching. For example, components of this invention may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

What is claimed is:

1. A method of assigning weights to data from an antenna array, comprising:

setting initial channel weights based on energy values;

updating channel weights using a least squares algorithm based on received data and expected data; and revising channel weights using a least mean square algorithm based on received data from multiple channels, expected data, and data combined from several channels;

wherein an ultra wideband preamble includes predetermined patterns that allow detection of a preamble signal, and additional preamble patterns that are used to perform channel equalization;

wherein the least mean squares updating is performed during reception of the preamble patterns that are used to perform channel equalization, with the timing of the least mean squares updating coordinated with the channel equalization.

2. The method of claim 1, wherein the setting is performed continuously until a signal is detected for an ultra wideband preamble.

3. The method of claim 1, wherein least mean square algorithm uses the weights set by the updating.

4. The method of claim 1, wherein the received data from multiple channels is weighted using the weights set by the updating, and the weighted data is combined into a single complex signal.

5. The method of claim 1, wherein the expected data includes the ultra wideband preamble.

6. The method of claim 5, wherein the preamble is defined by the Multiband OFDM Alliance (MBOA).

7. The method of claim 1, wherein calculation of the energy values is performed during reception of the preamble patterns that determine detection of the preamble signal, and is coordinated with the calculation that detects the preamble.

8. The method of claim 1, wherein the assigning is performed in the time domain, before a Fast Fourier Transform and channel equalization.

9. The method of claim 1, wherein the assigning is performed after analog to digital conversion, using digital signal processing techniques.

10. The method of claim 1, wherein the setting sets a weight corresponding to a channel path having the highest energy to 1 and remaining weights to 0.

11. The method of claim 1, wherein the method is performed for more than one sample per clock.

12. A system for assigning weights to data from an antenna array, comprising:

means for setting channel weights based on energy values;

means for updating channel weights using a least squares algorithm based on received data and expected data; and means for revising channel weights using a least mean square algorithm based on received data from multiple channels and expected data wherein the least mean squares updating is performed during reception of preamble patterns that are used to perform channel equalization, with the timing of the least mean squares updating coordinated with the channel equalization.

13. A system for assigning weights to data from an antenna array, comprising:
- a set weight engine capable of setting channel weights based on energy values;
- a least squares engine, communicatively coupled to the set weight engine, capable of updating channel weights using a least squares algorithm based on received data and expected data; and
- a least mean square engine, communicatively coupled to the least squares engine, capable of revising channel weights using a least mean square algorithm based on received data from multiple channels and expected data;
- wherein the system includes frequency hopping using multiple frequency bands;
- wherein the least squares engine is expanded to calculate separate weights for each of the frequency bands.

14. The system of claim 13, wherein the set weight engine continues to set weights until data is found following an ultra wideband preamble.

15. The system of claim 13, wherein the least mean square algorithm uses the weights set by the least square engine.

16. The system of claim 13, wherein received data from multiple channels is weighted using the weights set by the engines, and the weighted data is combined into a single complex signal.

17. The system of claim 13, wherein the expected data includes an ultra wideband preamble.

18. The system of claim 13, wherein the set weight engine sets a weight corresponding to a channel path having the highest energy to 1 and remaining weights to 0.

19. The system of claim 13, wherein the system operates at more than one sample per clock.

20. The system of claim 13, wherein the weights calculated for each of the frequency bands are stored.

21. The system of claim 20, wherein the stored weights are applied to data in the appropriate frequency band.

* * * * *